Feb. 23, 1954 F. M. JOHANSEN 2,670,116
METHOD AND APPARATUS FOR THE EXTRUSION FILLING
OF CONTAINERS WITH ICE CREAM AND OTHER
SIMILAR SEMIPLASTIC FOOD SUBSTANCES
Filed Nov. 17, 1950 2 Sheets-Sheet 1
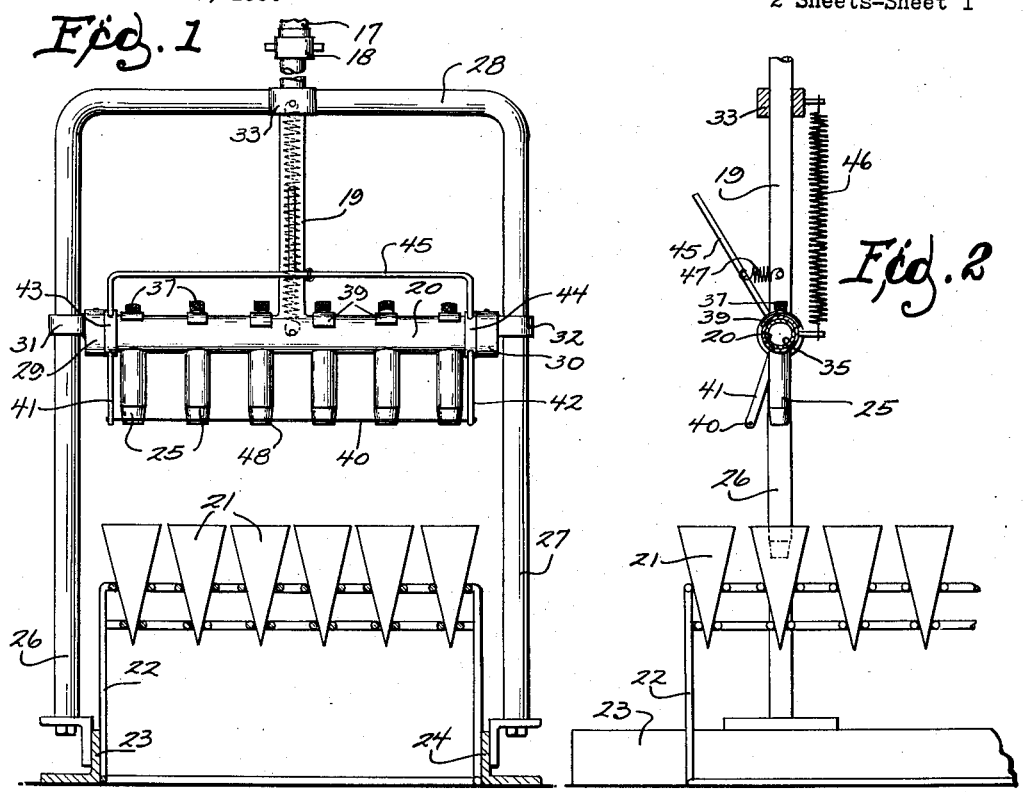
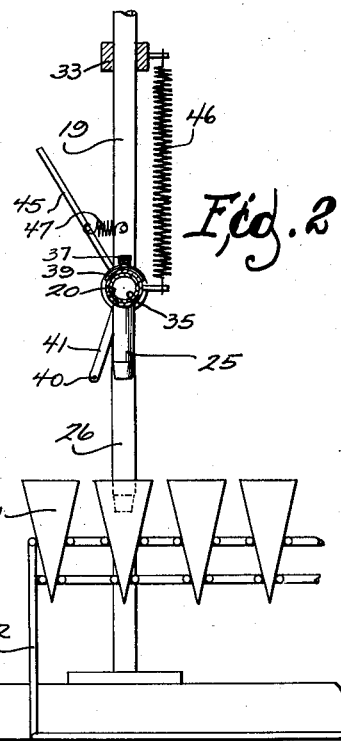
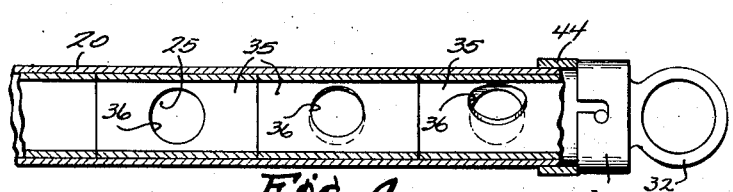
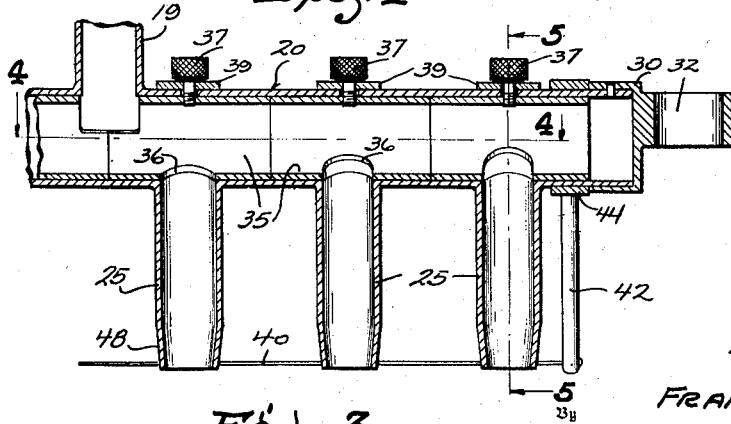
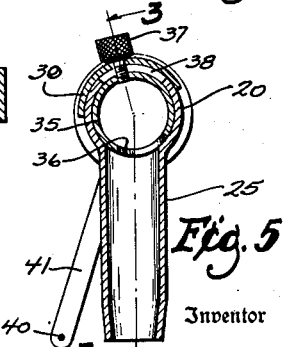
Inventor
FRANK M. JOHANSEN
Wheeler, Wheeler & Wheeler
Attorneys

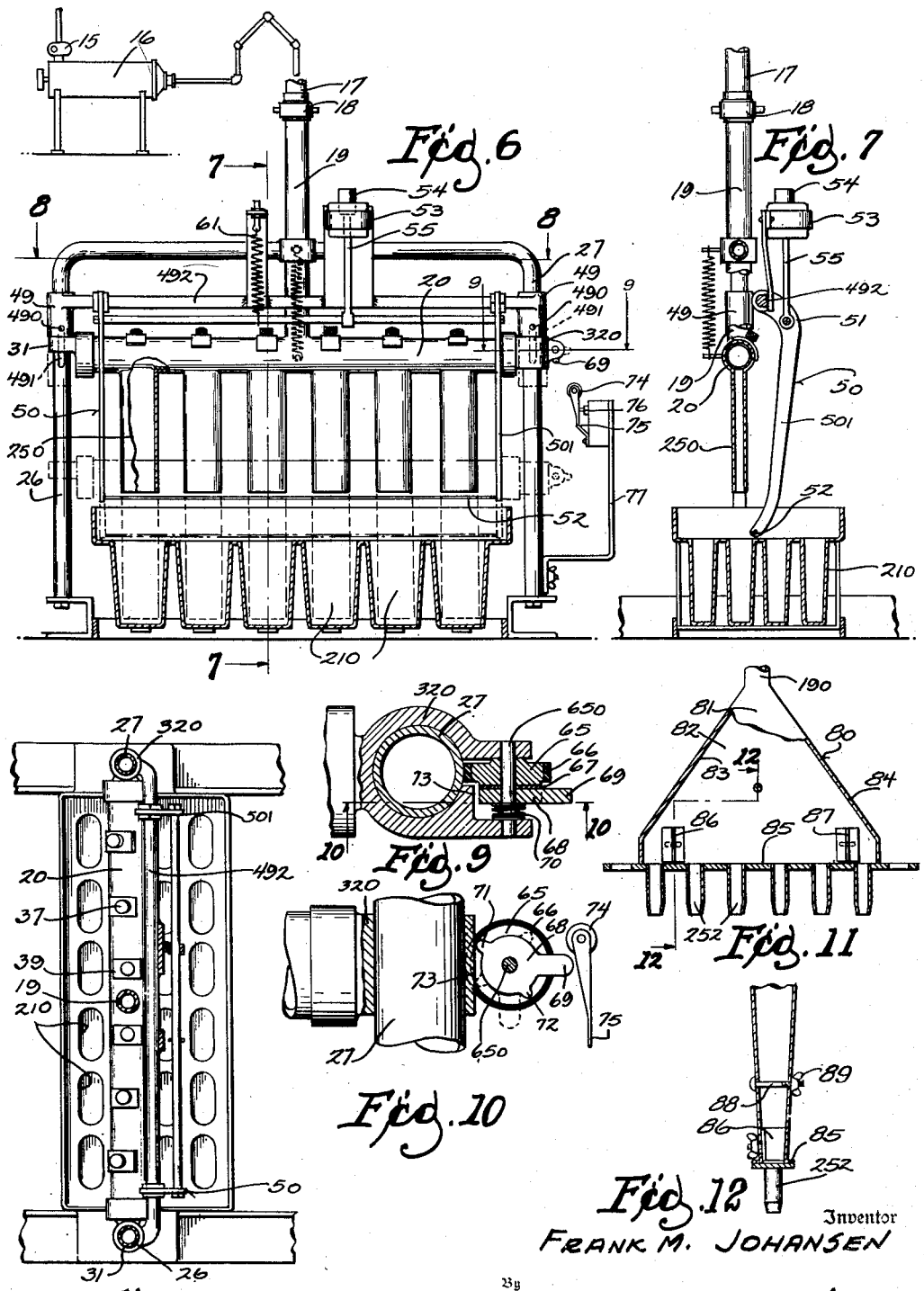

UNITED STATES PATENT OFFICE 2,670,116

METHOD AND APPARATUS FOR THE EXTRUSION FILLING OF CONTAINERS WITH ICE CREAM AND OTHER SIMILAR SEMIPLASTIC FOOD SUBSTANCES

Frank M. Johansen, Milwaukee, Wis.

Application November 17, 1950, Serial No. 196,214

21 Claims. (Cl. 226—23)

This invention relates to methods and apparatus for the extrusion filling of containers with ice-cream and other similar semi-plastic food substances.

The ordinary ice-cream freezers in common use deliver the semi-frozen ice-cream under pressure, and such freezers are typical of a source from which semi-plastic foods may be received under pressure. While the invention has some generic application to non-frozen plastic foods, such as cottage cheese and the like, it is peculiarly adapted to solve certain problems having to do with the distribution of frozen comestibles for concurrent and substantially uniform delivery through a plurality of nozzles so that an equal amount will have to be deposited in each of a number of containers to be filled. In this regard, the invention is based on the discovery that the flow of a semi-plastic frozen product through a plurality of nozzles depends not so much upon uniformity of cross section and uniformity of distance of flow, as upon the temperature of the paths of flow, it being found that a path of flow which involves relatively warm walls will permit the semi-frozen material to pass much more rapidly than as if the walls were cold. In each of the embodiments herein disclosed, uniformity of flow is achieved. One device employs baffles along the walls traversed by the frozen mix for the greatest distance but along which the mix passes more freely because these walls are the outermost walls and consequently warmer. Another device herein disclosed compensates for wall temperature and any other factors affecting relative flow by providing the respective nozzles with individual flow-controlling valve means.

The invention also involves procedures whereby the extrusion of the plastic material into the containers to be filled is initiated below the tops of the containers, the filling nozzle being progressively withdrawn from the containers, and the plastic being positively severed by a cut-off knife as the nozzle leaves the container, thereby permitting the flow to be continuous, the velocity of the material preventing the material from dropping until a new set of containers is positioned to receive the continued flow.

By way of exemplification, and since the extrusion of a frozen comestible offers more difficulty than the filling of any other semi-plastic product, I have shown the invention from the standpoint of the filling of ice-cream cones and bar molds.

In the drawings:

Fig. 1 is a view in transverse section of filling apparatus embodying the invention.

Fig. 2 is a view in longitudinal section of the apparatus shown in Fig. 1.

Fig. 3 is a view in vertical section on the line 3—3 of Fig. 5.

Fig. 4 is a view taken in section on the line 4—4 of Fig. 3.

Fig. 5 is a view taken in section on the line 5—5 of Fig. 3.

Fig. 6 is a view similar to Fig. 1 showing a somewhat modified cut-off arrangement and showing molds rather than cones for receiving the comestible.

Fig. 7 is a view taken in section on the line 7—7 of Fig. 6.

Fig. 8 is a view taken in section on the line 8—8 of Fig. 6.

Fig. 9 is an enlarged detail view taken in section on line 9—9 of Fig. 6.

Fig. 10 is a detail view taken in section on the line 10—10 of Fig. 9.

Fig. 11 is a view taken in transverse section through a modified filling head embodiment.

Fig. 12 is a detail view taken in section on the line 12—12 of Fig. 11.

Figs. 13 and 14 are diagrammatic views illustrating in section on a reduced scale the sequence of operations involved in filling a receptacle.

The embodiment shown in Figs. 11 and 12 has been tested and found to operate satisfactorily, but the embodiment shown in Figs. 1 to 5, or that shown in Figs. 6 to 10, is the preferred construction.

The pressure supply of semi-plastic comestible will vary as to source according to the comestible, and whether it comprises frozen or non-frozen material. Thus the source of supply is represented generally by the pipe 17 which, in the case of the embodiments shown, is a universally jointed tube. However, I have illustrated diagrammatically in Fig. 6, by way of exemplification, a freezer 16 from which semi-frozen, semi-plastic comestible is conventionally discharged under pressure developed by mixture input pump 15. Coupling 18 connects the pressure supply tube 17 with a vertical pipe 19 leading to a transverse header 20. In the arrangement shown in Figs. 1 and 2, the receptacles to be filled comprise the cones 21, these being mounted in a movable rack 22 which is positioned between the guide flanges 23, 24 to locate one row of cones directly below the respective filling nozzles 25. As shown in Fig. 2, additional rows of cones may be carried by the rack so that as the rack is advanced beneath the guides, successive rows of empty cones may be registered with the nozzles for filling.

Rising above the flanges 23, 24 at the base of the machine are guide rods 26, 27 connected by an integral transverse top member 28. The caps 29, 30 at the ends of header 20 are integrally provided with bearing collars 31, 32 riding upon the rods 26, 27 to guide the vertical reciprocation of the cross head 28 and supply pipe 19. The supply pipe passes through a bearing 33 in the top frame member.

Sleeve valves 35 individual to the respective nozzles 25 control communication between the header 20 and the nozzles as best shown in Figs. 3, 4 and 5. Each of the sleeves 35 is closely fitted in the header tube 20 for rotation therein. Each has a port at 36 which may be registered to a greater or lesser degree with the respective nozzle 25, and each is provided with an operating handle which preferably takes the form of a thumb screw 37 threaded into the valve sleeve and extending outwardly through a peripheral slot 38 in the header. Each such handle is desirably provided with an arcuate closure 39 of sufficient angular extent to close the slot 38 in all positions of the valve. Figs. 3 and 4 show in various relative positions the several valves controlling the three nozzles there illustrated, the port 36 being in full registry with the nozzle 25 at the left in Figs. 3 and 4 and in incomplete registry with the intermediate nozzle and materially out of registry with the nozzle at the right, as further appears in Fig. 5.

Some means is provided for positively severing the semi-plastic material issuing from the nozzles. In the device shown, the severing means comprises a cut-off "knife" 40 in the form of a wire stretched between the arms 41, 42 which are pivoted by means of collars 43, 44 to the header tube 20 and cross connected by the frame 45, which also serves as a handle. A tension spring 46 connected to the bearing collar 33 and to the cross head counter-balances the weight of the cross head. No means is shown for the mechanical operation of the cross head or the cut-off wire, both of which operations may be assumed for the purposes of the present disclosure to be manually actuated.

With a row of empty cones 21 positioned in rack 22 beneath the corresponding row of nozzles 25, and with semi-plastic comestible being supplied under pressure through pipe 17 and extruded from the nozzle, the cross head is lowered to bring each nozzle downwardly into the receptacles here represented by the cones 21. Adequate space is left between nozzles and receptacles for the escape of air, but the semi-plastic material tends to distribute itself about the bottom of the receptacle before rising about the nozzle. To this end, the ends of the nozzles 25 are desirably somewhat reduced in cross section as, for example, by tapering them at 48.

Since flow of the semi-plastic material is already occurring from the nozzles, the filling operation will commence as rapidly as the nozzles can be lowered into the receptacles as shown in dotted lines in Fig. 2 and in full lines in Fig. 13. As the filling progresses, the operator releases his downward pressure on the header 20, or, if the spring 46 be inadequate to lift the header, the operator may manually raise it from the position shown in Fig. 13 to that shown in Fig. 14. As soon as this latter position is reached, the handle 45 is used to oscillate the cut-off wire or knife 40 rapidly across the path of flow from the nozzle to sever the stream of semi-plastic material from the material previously deposited in the now filled receptacle 21. The cut-off knife or wire may be left in either of its extreme positions, or oscillated forth and back between the nozzle in each operation.

As previously indicated, if the semi-plastic material comprises an ice-cream, an ice, or a sherbet, or the like, it tends to absorb heat from the walls through which it passes en route to the point of delivery, and the warmer it becomes, the more plastic it becomes, and the greater is the extent to which the molten surface of the material lubricates the wall surfaces with which it comes in contact. Accordingly, contrary to the usual experience in controlling distribution of extruded material through a plurality of nozzles, a semi-frozen material will flow more rapidly to a remote nozzle than to a nozzle proximate the source. In a device of this character, however, the distribution does not proceed uniformly according to this factor, but is affected by the length of the path which the material must travel and the angularity of such path and various other factors. Accordingly, the sleeve valves individually controlling flow through the respective nozzles will not ordinarily be set to the progressively decreasing openings shown in Figs. 3, 4 and 5, these being merely representative of the possibility of adjustment. Instead, it will ordinarily be necessary to adjust each valve until the flow is uniform. Thereafter, a given material may be handled over an indefinite period with continued uniformity of flow from the respective nozzles so that each of the receptacles will be filled to substantially an identical extent.

As soon as the streams flowing from the respective nozzles to a given row of receptacles are severed by the cut-off knife, during, or subsequent to, the raising of the cross head, the receptacle rack is advanced to present another row of empty receptacles, and the filling operation is repeated.

The construction shown in Figs. 6 to 11 is very similar to that above described, but the receptacles 210 comprise molds such as those used in making bars of ices or frozen pop or the like. The nozzles 250 are generally complementary to the molds.

The cut-off, instead of being manually operated, is electrically operated and controlled by the means presently to be described.

Sleeves 49 slidable upon the upright guide bars 26 and 27 to the extent permitted by pins 490 in slots 491 are cross connected by rod 492 which pivotally supports the cut-off frame 50. The legs 501 of this frame extend initially in an outward direction from the fulcrum on rod 492 to knees 51 (Fig. 7). Thence, the frame legs 501 extend downwardly to carry the cut-off wire 52.

Supported on the cross rod 492 is a solenoid or solenoids 53 with armature means 54 pivotally connected by connecting rod 55 with the elbow 51 so that when the solenoid is energized, and the armature means is attracted downwardly, such motion is transmitted to the frame 50 to oscillate the cut-off wire 52 across the path of flow from the respective nozzles. A spring 61 returns the frame member 50 and cut-off wire 52 to the original position of the parts as soon as the solenoid 53 is de-energized. Since bar molds normally have surrounding flanges as shown, this arrangement permits the entire wire cut-off carrier and its actuating connections to drop into the mold flange to the proper level for cut-off action, the sleeves 49 and the cut-off mechanism carried thereby being returned upwardly as the header elevates the nozzles in the retractive movement thereof. At the top of the stroke, the cut-off frame and the nozzles both clear the mold to permit unobstructed movement thereof.

For controlling the energization and de-energization of the solenoid, I may employ the switching mechanism shown in Figs. 6, 9 and 10. The bearing collar 320 which supports the cross head 20 in the present embodiment is slotted to receive a roller 65 desirably provided with a rubber tire 66, the periphery of which rides on the guide bar 27. The slot in the collar 320 is spanned by a shaft 650 upon which the roller rotates. A side face of the roller has a friction clutch facing 67 engaged by the side of a switch actuator 68 from which the switch actuating finger 69 projects radially. Thrust engagement of the actuator 68 against the clutch facing 67 is assured by a compression spring 70. Whereas the roller 65 turns freely on shaft 650, the switch actuator 68 has limited oscillation on such shaft, being provided with lugs 71 and 72 which engage the surface 73 of collar 320 to define the extreme positions of oscillation of the switch actuator. As the cross head assembly comprising the supply pipe 19 and the header 20 moves downwardly, the rolling contact of roller 65 upon the guide tube 27 causes the roller to rotate clockwise as viewed in Fig. 10, thereby holding the arm 69 inoperative in the dotted line depending position there illustrated, the stop 72 being engaged with surface 73. However, in the upward movement of the cross head, with the roller 65 turning counter-clockwise as viewed in Fig. 10, friction is transmitted therefrom to oscillate the switch actuator 68 counter-clockwise until its lug 71 engages the stop surface 73. In this position of the parts, the arm 69 projects laterally as shown in full lines in Fig. 10 so that, in the upward movement of the cross head, the arm 69 strikes the roller 74 on the switch lever 75 to depress the switch contact 76, thereby closing the circuit controlling solenoid 53. This mechanism thus operates the cut-off knife solely during the upward movement of the cross head and only when the cross head reaches a desired position, as determined by the adjustment of the switch supporting bracket 77, in which position the nozzles have cleared the receptacles.

It will be understood that the disclosure in Figs. 6 to 11 with respect to the cut-off knife operation has no relation to the type of nozzle heads disclosed in Figs. 6 and 7, but may be used in conjunction with the types of nozzles shown in Figs. 1 to 5. Alternatively, the nozzles of Figs. 1 to 5, or any nozzles complementary to the type of receptacle to be filled, may be substituted for those shown in Figs. 6 and 7.

A different nozzle arrangement is suggested in the embodiment of Figs. 12 and 11, wherein the pipe 190, supported in any desired manner (manually if desired) and supplied with semi-plastic material under pressure, communicates with a chamber generically designated by reference character 80 which has front and rear walls 81, 82 and widely divergent narrow side walls 83, 84, such chamber having a laterally elongated bottom 85 from which issue the several nozzles 252. From such a chamber, a semi-frozen plastic mix of ice-cream or the like will issue much more rapidly from the end nozzles of the series than from the intermediate nozzles, despite the fact that it has a greater distance to travel in chamber 80. However, I have found that the mix will issue approximately uniformly from all of the intermediate nozzles which are remote from the side walls 83 and 84.

To retard the flow to the terminal nozzles of the transverse series, I use baffles at 86 and 87 which do not completely obstruct the flow, being desirably narrower than the front to rear dimension of the chamber 80 (see Fig. 13). However, the baffles seem to function because they provide friction surfaces that are within the mix and hence do not radiate heat rapidly to the external atmosphere, and consequently compensate by their friction for the reduced friction of flow of the mix to the end nozzles of the series and to the respective contiguous nozzles. Baffles of the general proportion shown have been found to effect a very satisfactory control and to make the flow from all of the nozzles substantially uniform.

However, because the front and rear walls 81 and 82 of a header of this form are nearly flat, they not only yield outwardly under pressure of the mix but, during continued flow, the relative rate of flow may change so that the original equality of distribution no longer is obtained. An adjustable wing nut 89 on bolt 88 enables control of the cross sectional form of the header and compensation for any change in relative rate of flow.

The device is used exactly as above described, and the flow to containers already filled can be cut off by either of the cut-off knives shown or by an entirely separate knife (not shown) differing from those illustrated only in that it is manually supported as well as manually operated.

In all embodiments, it will be noted that the nozzles open directly from the headers 20 or 80 wherein distribution to the respective nozzles is made. By eliminating any piping between the nozzles and the distribution header, I eliminate one source of irregularity in the distribution of the product.

I claim:

1. A device for the simultaneous filling of a number of containers, said device comprising a series of nozzles, a header in immediate communication with the nozzles for distributing therebetween the material to be filled into the containers, a source of material under pressure communicating with the header, and material flow restricting means comprising walls within the header for apportioning to respective nozzles the container filling material received from such source to promote uniformity of discharge of such material from respective nozzles.

2. The device of claim 1 wherein the supply means comprises an upright tube and the header a transverse tube, and the flow restricting means comprises valves individually adjustable respecting particular nozzles within said transverse tube.

3. The device of claim 2 in which the respective valves comprise sleeve valves fitted within said transverse tube and having apertures registrable with the respective nozzles opening therefrom, and handle means connected with the sleeve valves for the manipulation thereof within the tube.

4. A device of the character described comprising a supply pipe, a transversely extending header opening from the supply pipe, a series of nozzles opening downwardly from the header, a container rack support, means mounting the header and support for relative movement, and flow restricting means comprising walls within the header and individual to certain of said nozzles for regulating flow to said nozzles from said header.

5. The device of claim 4 in which the header comprises a flat flaring tube, and the restricting means individual to respective nozzles comprises baffles restricting flow from the flaring tube header to the respective nozzles opening from the header at the extreme sides thereof.

6. A device for the simultaneous filling of a number of containers, said device comprising a series of nozzles, a header in immediate communication with the nozzles for distributing therebetween the material to be filled into the containers, a source of material under pressure communicating with the header, means within the header for apportioning to respective nozzles the container filling material received from such source to promote uniformity of discharge of such material from respective nozzles, said header comprising front and rear walls and widely divergent side walls, and a laterally elongated bottom wall from which said nozzles open, said apportioning means comprising baffles extending upwardly from said bottom wall and spaced inwardly from the nozzles proximate to said divergent side walls of the header.

7. A device for filling successive rows of containers, said device comprising a container support, a header, means mounting the header and support for relative movement to and from each other, nozzles mounted on the header and spaced to register with respective containers to be filled and adapted in the relative reciprocation of the header and support to approach the bottoms of said containers, means for supplying semi-fluid comestible to the header under pressure sufficient to extrude such comestible from the respective nozzles, fluid restricting means within the header and comprising walls thereof for apportioning the comestible between respective nozzles, and a cut-off knife movable between the respective nozzles and the containers filled therefrom in the retracted position of the header respecting the support, and means supporting said knife for such movement.

8. The device of claim 7 in further combination with a knife-operating solenoid having an armature in operative connection with said knife for the actuation thereof, a solenoid controlling switch and camming means connected between said header and support for the closing of said switch to energize the solenoid.

9. The device of claim 8 in which said camming means is provided with means for rendering it operative only in the retractive movement of the header and not in the relative retractive movement of advance of the header towards said support.

10. The device of claim 8 in which the means rendering the camming means operative in the header retractive movement only comprises a header guide, a roller operating on the guide, a cam in frictional driven connection with the roller, means limiting the oscillation of the cam in response to the friction of the roller thereon, and an arm projecting from the cam and movable in the oscillation of the cam to and from switch operating position.

11. A receptacle filling device comprising the combination with a receptacle support and a header having mounting means upon which the support and header are relatively movable to and from each other, filling nozzles carried by the header in registry with the positions of receptacles on said support, means for supplying under pressure to the header a comestible to be extruded from said nozzles, the header comprising a pipe extending transversely above the nozzles, and a cut-off knife having spaced knife-supporting arms at the ends of the series of nozzles pivoted upon a common axis substantially parallel to that of the pipe and upon which said knife is movable transversely of the streams of comestible extruded from the respective nozzles, whereby all such streams are severed substantially simultaneously.

12. The device of claim 11 wherein said arms are provided with a connecting handle for the manual operation of said knife.

13. The device of claim 12 wherein said arms are provided with an armature, together with a solenoid adapted when energized to attract said armature for the operation of said knife.

14. The device of claim 13 wherein said support and header are respectively provided with cam and switch means, the solenoid having a circuit controlled by said switch means for automatic operation in the course of retractive movement of the header respecting the support.

15. A method of filling receptacles with a semi-plastic comestible, which method comprises delivering the comestible under pressure to a header and thence to a plurality of nozzles, lowering the nozzles into a plurality of receptacles to the vicinity of the bottoms of the receptacles, extruding the semi-plastic material from the respective nozzles into the respective receptacles while restricting the escape area between the receptacles and the nozzles, regulating the flow of comestible at points within the header at least as between the nozzles most remote in the series of nozzles and a more centrally located nozzle in such series whereby to discharge the comestible substantially uniformly from the respective nozzles, withdrawing the nozzles from the receptacles as the receptacles fill, and, upon retraction of the nozzles from the receptacles, severing substantially simultaneously and positively the streams of comestible flowing from the respective nozzles.

16. In a device for dispensing plastic material having characteristics of fluid flow affected by temperature, the combination with a header, a material input connection to said header and a plurality of discharge nozzles communicating with said header whereby said material subdivides into streams feeding said nozzles, at least one of said nozzles being fed by one stream having greater heat transfer contact with said header than another said stream, and means restricting flow of said one stream whereby to substantially equalize its rate of flow with the rate of flow of the said other stream.

17. The device of claim 16 in which said header comprises an elongated tube, said nozzles comprising openings in said tube at different distances from said input connection, said flow restricting means comprising individually adjustable valves over said openings.

18. The device of claim 16 in which said header comprises a horizontal tube, said input connection being intermediate the ends of said tube, said nozzles comprising openings in said tube at different distances from said input connection, said flow restricting means comprising valves individually adjustable across said openings.

19. The device of claim 16 in which said header comprises a bottom wall, said nozzles being arranged in a row along said bottom, and side walls leading from said bottom wall to said input connection and along which streams feeding the end nozzles in said row will flow, the flow to intermediate nozzles being insulated from contact with said side walls by said end streams, said flow restricting means being mounted for adjustment and for control of flow of said end streams, relative to the said flow to intermediate nozzles.

20. The device of claim 19 in which said flow restricting means comprises baffles mounted on said bottom wall between said end nozzles and adjacent nozzles.

21. A method of dispensing plastic material having characteristics of fluid flow affected by temperature, comprising the steps of delivering the plastic through a header and along different flow paths in said header having different rates of heat transfer with the header, and restricting the flow of material in those paths in which rate of flow is increased because of said heat transfer whereby to deliver said material uniformly in all said paths.

FRANK M. JOHANSEN.

References Cited in the file of this patent

UNITED STATES PATENTS

| Number | Name | Date |
|---|---|---|
| 680,762 | Caton | Aug. 20, 1901 |
| 1,830,335 | Punzmann | Nov. 3, 1931 |
| 1,866,439 | Wood et al. | July 5, 1932 |
| 2,037,691 | Baldwin | Apr. 21, 1936 |
| 2,047,626 | Griffith | July 14, 1936 |
| 2,145,240 | Adams | Jan. 31, 1939 |
| 2,195,441 | Bagby | Apr. 2, 1940 |
| 2,451,011 | Yoars | Oct. 12, 1948 |